United States Patent [19]

Eckloff

[11] Patent Number: 5,611,554
[45] Date of Patent: Mar. 18, 1997

[54] CART

[75] Inventor: Donald Eckloff, Cranford, N.J.

[73] Assignee: Star Metal Products, Inc., Clark, N.J.

[21] Appl. No.: 429,734

[22] Filed: Apr. 26, 1995

[51] Int. Cl.⁶ .................................................. B62B 3/00
[52] U.S. Cl. ...................................... 280/79.2; 280/47.34
[58] Field of Search ........................... 280/79.11, 79.2,
280/79.3, 47.12, 47.131, 47.16, 47.17, 47.19,
47.2, 47.24, 47.26, 47.34, 47.35, 33.991,
33.997, 33.998, 87.021, 651; 108/91; 29/516;
211/106, 181, 182

[56] References Cited

U.S. PATENT DOCUMENTS

| | | | |
|---|---|---|---|
| 715,116 | 12/1902 | Morris et al. | 280/79.2 |
| 828,232 | 8/1906 | Morris et al. | 280/7.12 |
| 904,142 | 11/1908 | Moore | 220/9.1 |
| 917,820 | 4/1909 | West | 248/97 |
| 1,902,338 | 3/1933 | Riley | 211/41 |
| 2,319,589 | 5/1943 | Drinkwater | 280/47.35 |
| 2,468,375 | 4/1949 | Paddock | 280/47.16 |
| 2,726,095 | 12/1955 | Emery | 280/79.2 |
| 2,757,935 | 8/1956 | Sofia | 280/654 |
| 2,918,295 | 12/1959 | Milner | 280/652 |
| 3,132,405 | 5/1964 | Jennings | 249/210 |
| 3,215,182 | 11/1965 | Silverman | 312/35 |
| 3,310,089 | 3/1967 | Silverman | 312/35 |
| 3,423,101 | 1/1969 | Boeye | 280/46 |
| 3,685,824 | 8/1972 | Quinn | 482/17 |
| 3,698,735 | 10/1972 | Bloomfield et al. | 280/47.35 |
| 3,756,548 | 9/1973 | Santarelli et al. | 248/98 |
| 3,806,146 | 4/1974 | Shaw | 280/7.12 |
| 4,175,761 | 11/1979 | Marshall | 280/47.18 |
| 4,244,410 | 1/1981 | Silverman | 312/35 |
| 4,300,611 | 11/1981 | Silverman | 312/35 |
| 4,512,591 | 4/1985 | Plante | 280/47.35 |
| 4,635,951 | 1/1987 | Berfield et al. | 280/47.4 |
| 4,640,521 | 2/1987 | Berfield | 280/47.34 |
| 4,650,200 | 3/1987 | Berfield et al. | 280/47.26 |
| 4,684,087 | 8/1987 | Spickard | 280/97 |
| 4,692,050 | 9/1987 | Kaufman | 423/3 |
| 4,720,048 | 1/1988 | Maroney et al. | 280/47.34 |
| 4,821,903 | 4/1989 | Hayes | 280/47.06 |
| 4,915,329 | 4/1990 | Doninger | 280/47.34 |

FOREIGN PATENT DOCUMENTS

| | | | |
|---|---|---|---|
| 1479533 | 5/1987 | France | 280/47.34 |
| 2614255 | 10/1988 | France | 280/47.35 |
| 2190895 | 8/1986 | United Kingdom . | |
| 2171064 | 12/1987 | United Kingdom | 280/79.3 |
| 2265603 | 10/1993 | United Kingdom | 280/79.11 |

OTHER PUBLICATIONS

Royal Catalog E922.
Royal Catalog 924.
C. R. Daniels Catalog 40–6–50M–CP–791.
C. R. Daniels Catalog 131–10M–CT–787.

*Primary Examiner*—Richard M. Camby
*Assistant Examiner*—Frank Vanaman
*Attorney, Agent, or Firm*—Edward Dreyfus, Esq.

[57] ABSTRACT

A cart, hamper track, with removable liner includes a base assembly comprising a metal tubular continuous bottom frame formed of box girder construction and a top continuous metal tubular frame formed of sections certain ends of which are swaged to mate with other section ends. After mating assembly, these parts are welded together to form a non-detachable, unitary structure. Metal rods are welded to and depend from the top frame and have L-shaped bottom ends that cooperate and are supported by the bottom frame. The top and inner sidewall surfaces of the bottom box frame define openings that receive and support the horizontal end of the upstanding rods. The bottom frame also comprises two U-shaped butt welded sections. Openings are also defined in the frame member parts to enable excess paint to exit these parts during manufacture.

7 Claims, 5 Drawing Sheets

CART

BACKGROUND

The present invention relates to carts and more particularly to wheeled or castered hand carts, hamper tracks, and the like for various applications such as carrying packages, waste, hospital and laundry items, etc.

Prior art carts of the type described include U.S. Pats. Nos. 2,726,095 to Emery and U.S. Pat. No. 4,684,087 to Spickard. These carts include a base frame mounted on casters or wheels and side and top elements to confine the cart interior. U.S. Pat. No. 3,806,146 to Shawe discloses a disposal bag holder with a base having caster mounting plates mounted at the four corners of the base and an upper frame which holds the bag within a number of confining rods extending to the base. Each rod has a base portion that forms an L-shaped configuration with a horizontal end or shank that fits into strap seats that clamp the L-shaped rods to the base.

Also, Royal Basket Trucks, Inc., Darien, Wis., publicly introduced in about 1982 a cart that includes a base frame mounted on casters, which frame comprises cross members for increasing the rigidity and strength. An upper frame having side and end sections forming a ring holds the upper part of a vinyl or canvas bag or liner resting in the interior of the cart. A plurality of resilient, metal rods depend from the ring frame and have their lower ends or base portions terminating in step-shaped configurations facing toward the interior of the ring. The base assembly includes a rectangular peripheral members with apertures so that the peripheral members engage and support the horizontal portions of the step-shaped base configurations and the apertures of the peripheral member horizontal top surface receives or engages the ends or bottoms of the base portions of the rods.

U.S. Pat. 4,915,329 to Doninger discloses a similar cart designed to be quickly disassembled by providing upper metal tubular frame parts detachably held together by releasable saddle screws and nuts and a metal L-shaped peripheral base frame having a vertical part to receive and support the horizontal part of the step-shaped rod base and a horizontal ledge to engage the end or free vertical part of the step-shaped rod base.

Although these carts are functional, there is still a need in the art for improved carts having better strength and endurance characteristics and that can be manufactured efficiently for less costs. For example, the wooden bases of the ROYAL carts tend to weaken with constant pounding and loosen at their joints. The metal bases of the DONINGER cart are also weak for many applications and require too many base welds due to their L-shaped design. Also, the detachable screws at the upper frame tend to loosen with changes in temperature and time causing too much stress on the rods/upper frame welds which result in weld tears, cracks or breaks.

BRIEF DESCRIPTION OF ONE EMBODIMENT OF THE PRESENT INVENTION

An embodiment accordingly to the principles of the present invention includes a continuous tubular metal top frame member, a plurality of metal resilient rods spaced from each other, connected to the top frame member, and depending therefrom. A base assembly is provided that includes a continuous tubular metal bottom frame member. The bottom portions of the rods are engaged by and supported by the bottom frame member. Wheel or caster assemblies are mounted to the underside of the bottom frame member. With this design, the cart according to the present invention provides better strength and endurability than carts found in the prior art by reason of the top and bottom, continuous tubular member frame construction. Other aspects of a cart according to the principles of the present invention include forming the bottom frame member in a box construction with top and bottom surfaces and inner and outer side walls. Bottom portions of the depending rods form L-shaped configurations to be received by and supported by openings in the top surface and sidewall of the bottom frame member. In this way, lateral cart shocks and rod supporting forces are absorbed by the strong box girder or tubular construction of the bottom frame member.

Also according to the present invention, the upper or top frame is, after manufacture, continuous. It is formed by welding together two or four sections, the ends of some of which are swaged to a smaller diameter to telescope into the other, mating sections. During cart manufacture, the L-shaped rod lower ends are inserted into the openings of the top and, preferably, the interior surfaces of the box bottom frame, the upper frame sections are brought to their installed positions with various sections telescoped into other sections to form a preferably generally rectangular top frame, then the top frame sections are welded together to increase the strength of the top frame and prevent the disassembly or loosening of the various parts of the cart.

DRAWINGS

Other and further objects, aspects, and advantages afforded by the present invention will become apparent with the following detailed description of an embodiment of the present invention, when taken in view of the appended drawings, in which.

Figure 1:
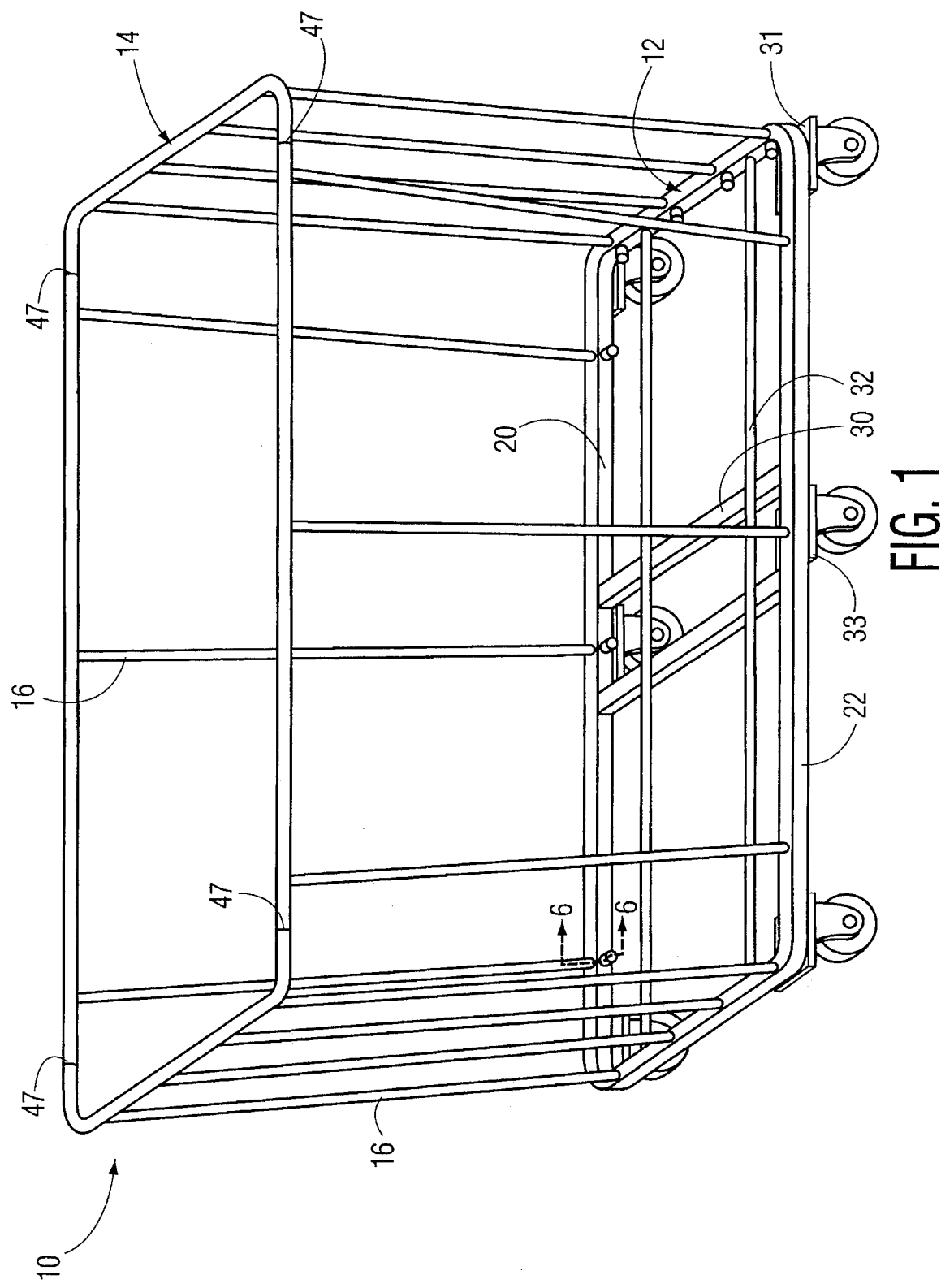
FIG. 1 is a perspective view of one embodiment cart according to the principles of the present invention, shown without the liner.
Figure 2:
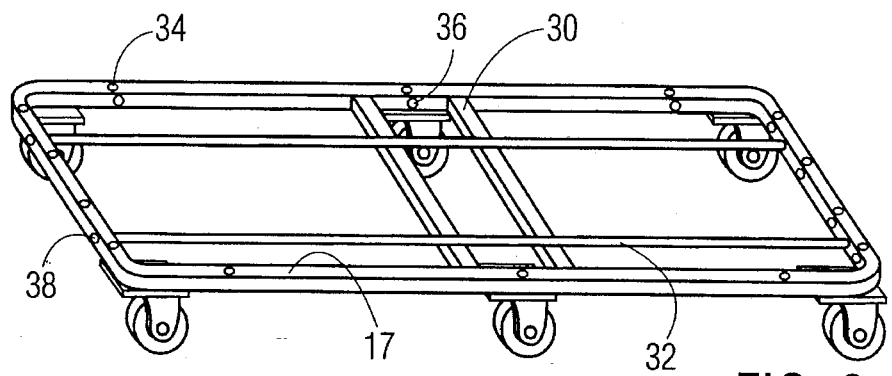
FIG. 2 is a perspective view of the base assembly of FIG. 1.
Figure 7:
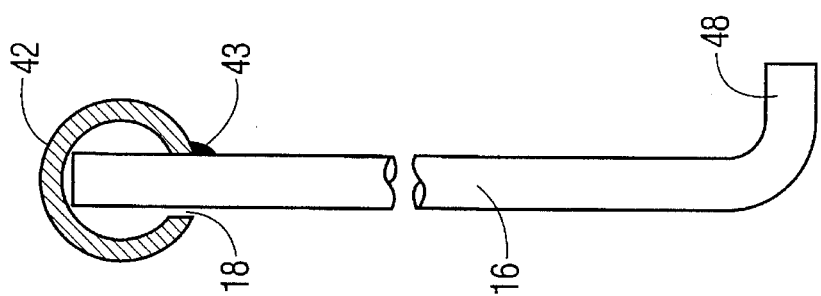

FIG. 7 is a side view of one of the rods 16 of FIG. 1 showing rod 16 mounted in side section 42, the latter being shown in section.

Figure 4:
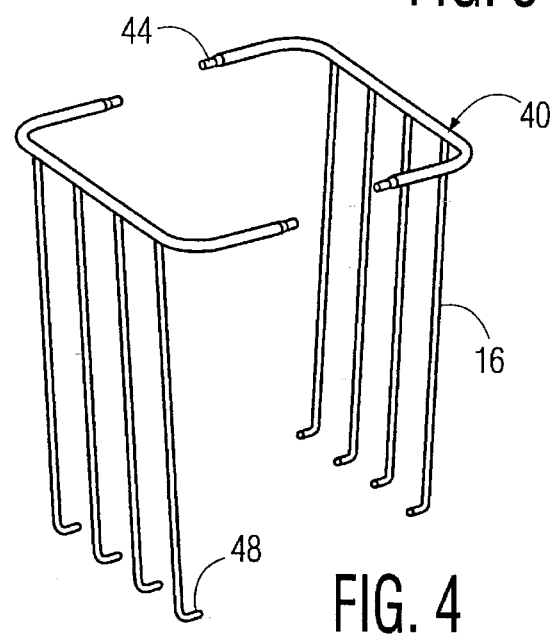
FIG. 4 is a perspective view of the disassembled end sections with depending rods of FIG. 1.
Figure 8:
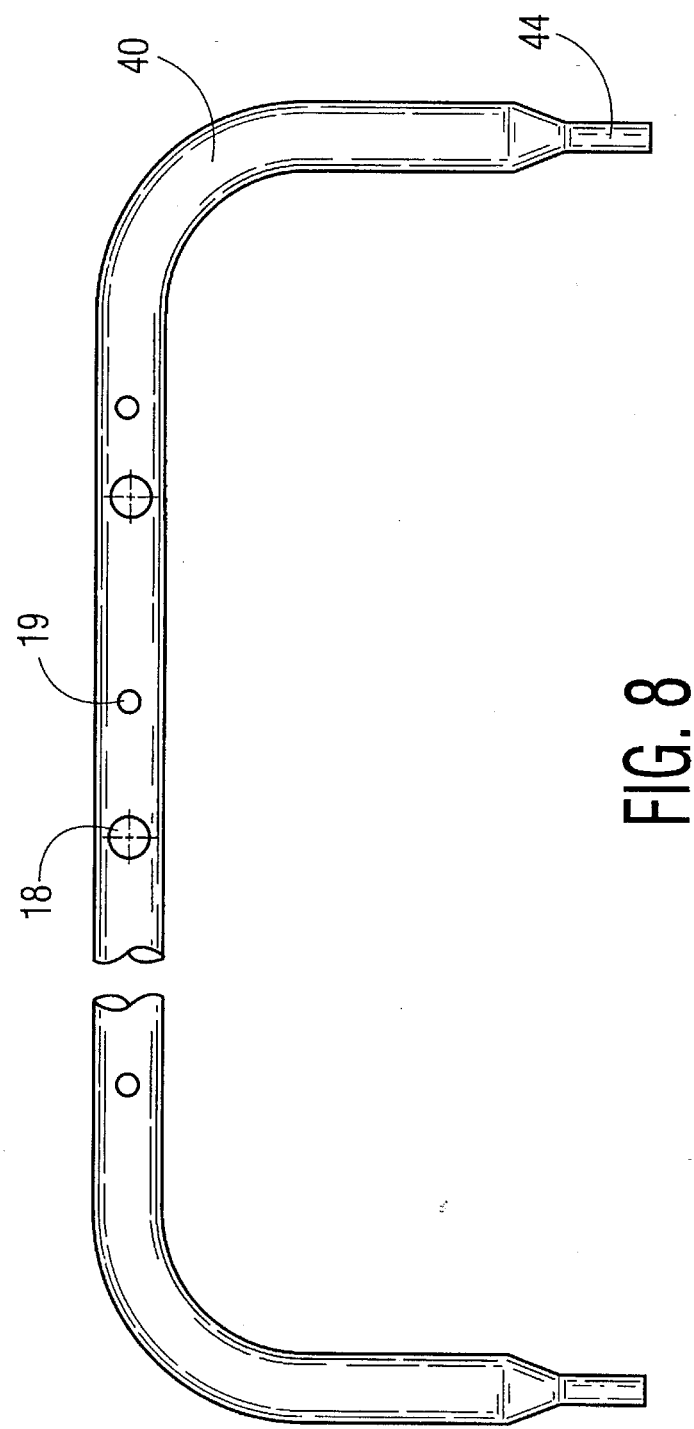

FIG. 8 is a bottom view of the end section 40 of FIG. 4.

Figure 3:
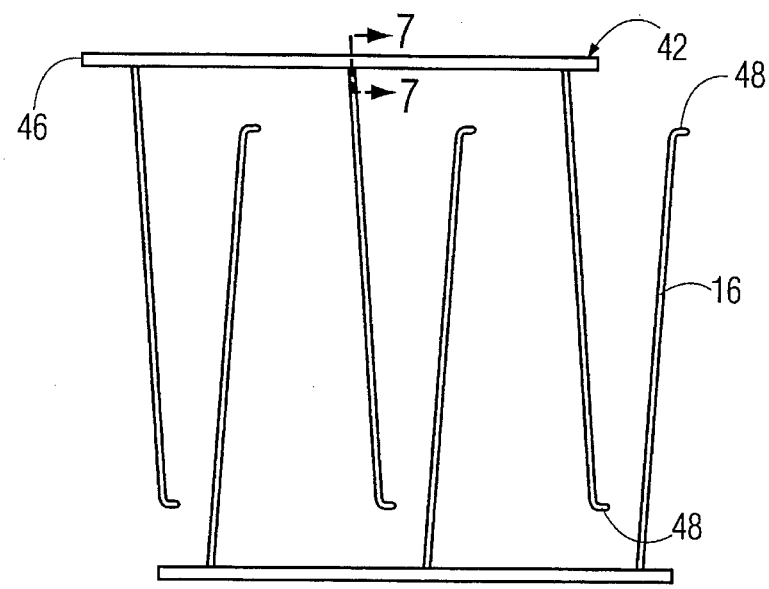
FIG. 3 is a perspective view of the dissambled side sections with depending rods of FIG. 1.
Figure 9:
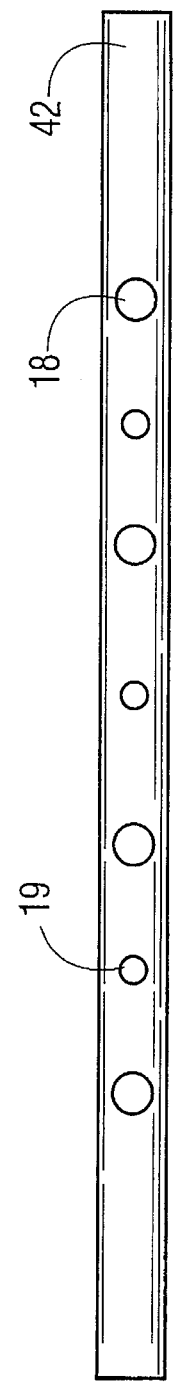

FIG. 9 is a bottom view of side section 42 of FIG. 3.

Figure 10:
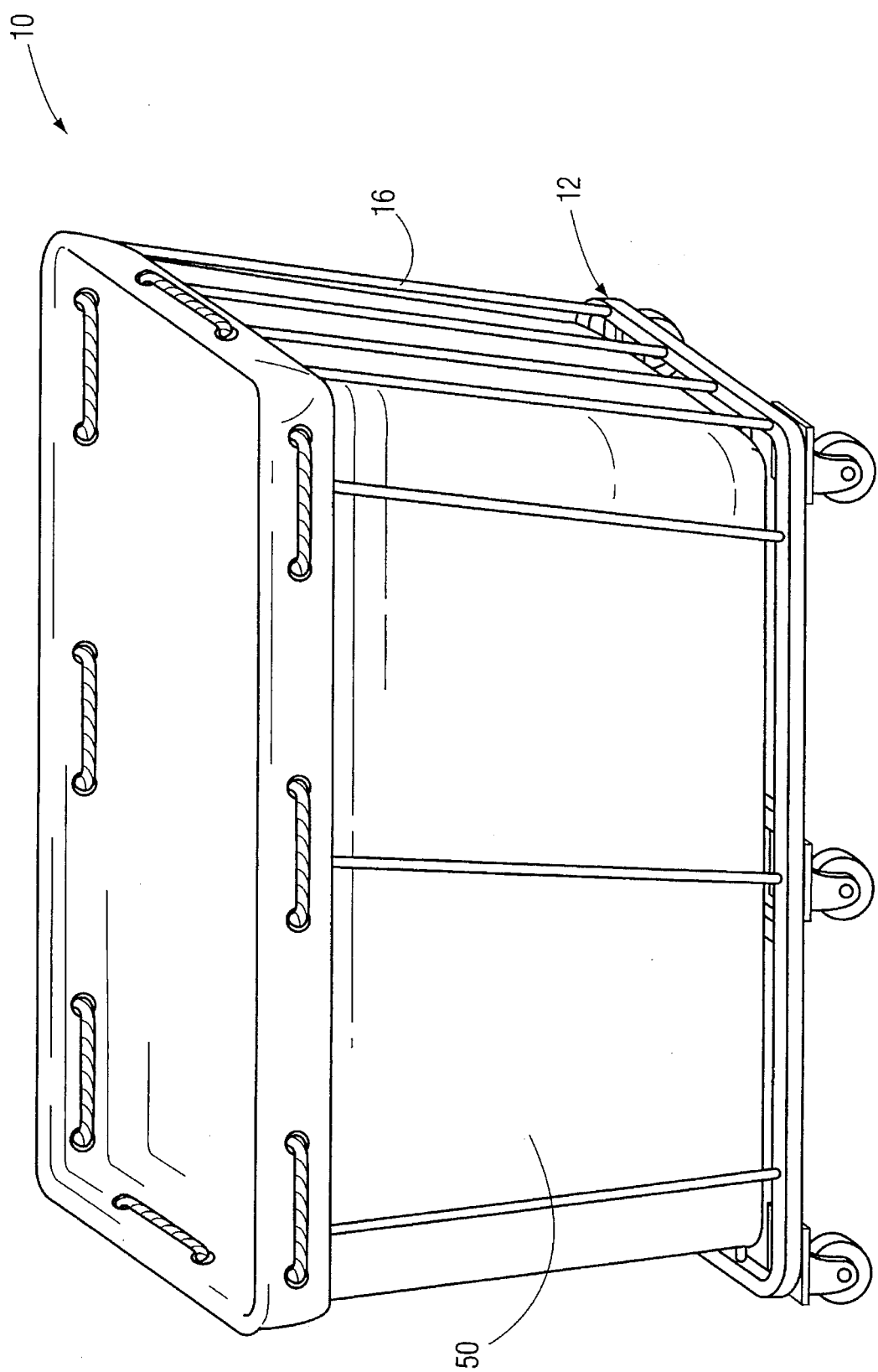

FIG. 10 is a perspective view of cart 10 with liner installed.

DETAILED DESCRIPTION OF AN EMBODIMENT OF THE PRESENT INVENTION

With reference to the figures, cart 10, preferably rectangular in shape, includes a wheeled base assembly, a continuous metal tubular top frame 14, and a plurality of resilient, metal rods 16 spaced from each other and having top portions connected to frame 14 and bottom portions mounted to base assembly 12, in a manner described below.

Figure 5:
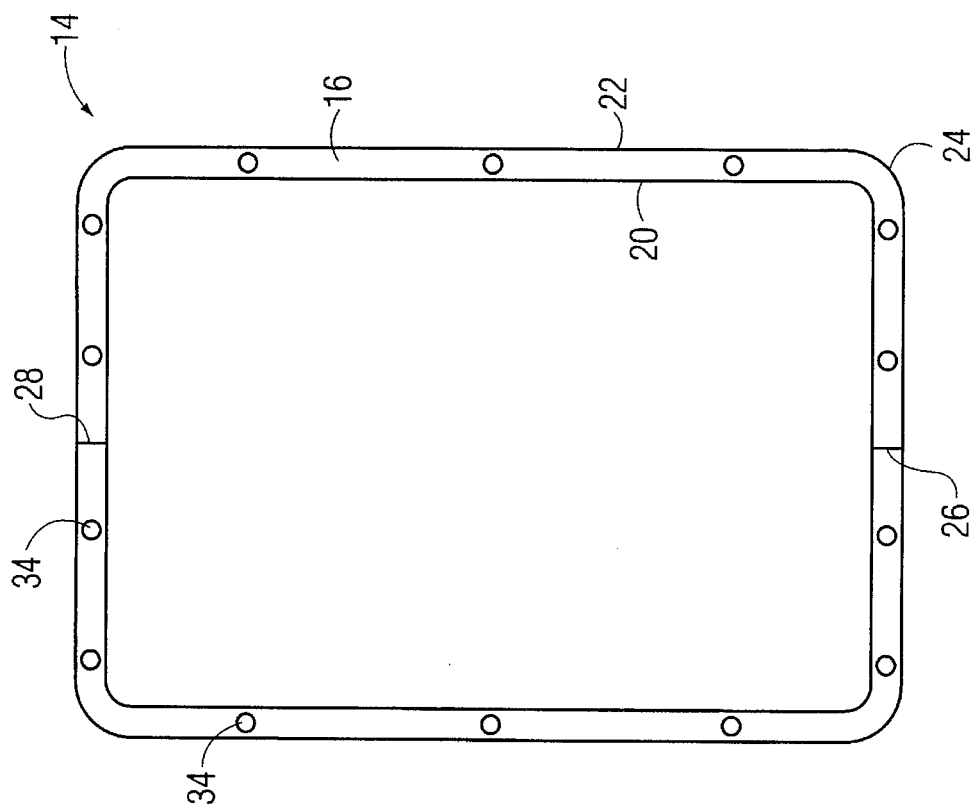
FIG. 5 is a plan view of the bottom tubular member of FIG. 1.
Figure 6:
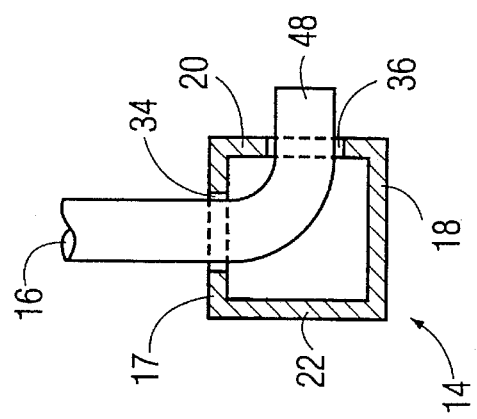
FIG. 6 is a section view taken along line 6—6 of FIG. 1.

The base assembly comprises a continuous, metal tubular bottom frame 14 having a box girder or box tubular construction with top surface 17, bottom surface 18, interior side wall 20 and exterior side wall 22. Frame 14 is formed continuous from two tubular sections bent into U-shape with rounded corners 24 and butt welded together at 26 and 28. Metal struts 30 extend across and are welded to inner walls 20 and reinforcement rods 32 extend transverse to struts 30 and have their ends extending through openings in and welded to inner side wall 20 to provide added strength and rigidity to assembly 12. As seen in FIGS. 5 and 6, bottom frame defines a plurality of openings 34, preferably, punched in top surface 17 and a plurality of openings 36 preferably punched in interior side wall 20 and aligned toward the cart interior with respective openings 34. Additional openings 38 are provided on the outside wall of one end portion of frame 14. Frame 14 can be dip painted during manufacturing because openings 38 permit excess paint to exit the interior of frame 14.

Flat caster mounting plates are welded to the underside of frame 14, preferably at the corners thereof. For larger carts, center caster mounting plates 33 can be welded to the mid-portions of frame 14 side sections, which plates 33 releasably mount casters slightly below that of corner plates 31.

Cart 10 also includes a continuous metal tubular top frame made of four sections, namely, two U-shaped end sections 40 with rounded corners and two side sections 42. These sections are all tubular with, in one embodiment, circular cross sections. Sections 40 have ends 44 swaged to a smaller diameter for telescopic insertion into ends 46 of sections 42. The underside parts of sections 42 and 44 can define spaced openings 18 that receive the tops of rod 16. Once inserted, each rods is welded as at 43 for permanent connection to tubular sections 42 or 44. Openings 19 defined by sections 42 and 44 enable excess paint to exit these tubes during manufacture.

Rods 16 are preferably straight through a suitable height for top frame 14 and have bottom portions terminating in an L-shaped configuration 48 or rod horizontal end.

During the manufacture of cart 10, the L-shaped bottoms of rods 16 are inserted first through openings 34, then the respective top frame section is rotated upward causing the horizontal ends 48 of rods 16 to penetrate openings 36. The section ends 44 are telescoped into the ends of sections 42 as the respective sections are installed. This is permitted by the lateral resilience of rods 16. However, it should be understood that at this stage the top frame would simply detach or loosen if used in this state. Once all four sections of top frame 14 are so installed and to complete the manufacture of the cart frame, the mating ends of sections 42 and 44 are welded together at 47 to form the continuous, non-detachable, metal tubular top frame 14. Since frame 14 is non-detachable, all metal parts of cart 10, except the mountable casters, are fixed into a unitary, structure that can not be disassembled or loosened up with usage. Thus, the cart 10 metal structure is ready for use or stacking. For use, the casters can be mounted and a vinyl or canvass liner 50 lashed or otherwise installed within the cart interior formed by rods 16.

With respect to stacking, it is preferable for the top frame 14 to be dimensioned in a greater, but congruous, rectangle compared to the bottom frame assembly 12, with rods 16 extending slightly downward and inward from frame 14 to facilitate stacking of the finished cart structure, without casters mounted. In one example, the height of rods 16 was selected so that the base assembly 14 of the stacked upper cart was about 8 to 10 inches above the base assembly of the cart into which it is stacked.

It will be understood that various modifications and changes can be made to the herein disclosed embodiment without departing from the spirit and scope of the present invention.

I claim:

1. A cart comprising:

a continuous tubular metal top frame member, a plurality of resilient metal rods spaced from each other and connected to and depending from said top frame member for supporting said top frame member, a base assembly comprising a continuous tubular metal bottom frame member, bottom portions of said rods being engaged by and supported by said bottom frame member, and wheel means connected to an underside of said base assembly for supporting the base assembly, and wherein said bottom frame member is generally rectangular with two end portions and two side portions, and said bottom frame member comprises a box tubular construction with top and bottom walls and interior and exterior side walls, and wherein said top walls include a plurality of openings which receive and engage upstanding portions of said plurality of rods, and wherein said rod bottom portions comprise L-shaped extremities such that horizontal ends of said bottom portions extended toward said interior side walls of said bottom frame member, and said interior side walls include openings through which said horizontal ends extend.

2. A cart according to claim 1, wherein said bottom frame member comprises rounded corners with curved interior and exterior side walls and top and bottom wall edges, said wheel means comprises caster mounting plates welded to the underside of said bottom wall substantially at each corner of said bottom frame member, and casters releasably mounted to said caster plates.

3. A cart according to claim 2, wherein mid-section caster mounting plates are welded to the underside of the mid-sections of the side portions of said bottom frame member for releasably mounting casters in a position slightly below the positions of said corner casters, and casters releasably mounted to said mid-section mounting plates.

4. A cart according to claim 3, wherein at least two generally parallel reinforcing rods are welded between the end portions of said bottom frame member, and at least two tubular metal cross struts having box girder constructions are welded between mid-sections of the side portions of said bottom frame member.

5. A cart according to claim 1, wherein said bottom frame member consists of two U-shaped sections butt welded together.

6. A cart according to claim 5, wherein said top and bottom frame members define openings for enabling excess paint to exit portions of said top and bottom frame members during a dip painting manufacturing process.

7. A cart according to claim 1, wherein said top frame member includes a plurality of openings for receiving and engaging the top portions of said plurality of rods, said rods being welded to said top frame member, and wherein said top frame member comprises at least two sections, at least one of said sections having an end swaged to a diameter smaller than the diameter of the other section for telescopic mating therewith, and said sections being welded together where said ends telescope together.

* * * * *

UNITED STATES PATENT AND TRADEMARK OFFICE
CERTIFICATE OF CORRECTION

PATENT NO. : 5,611,554
DATED : March 18, 1997
INVENTOR(S) : Donald Eckloff

It is certified that error appears in the above-indentified patent and that said Letters Patent is hereby corrected as shown below:

```
Column 4, line 27, change "extended" to --extend--.
```

Signed and Sealed this

First Day of July, 1997

*Attest:*

*Attesting Officer*

BRUCE LEHMAN

*Commissioner of Patents and Trademarks*